US009451492B2

(12) United States Patent
Wu (10) Patent No.: US 9,451,492 B2
(45) Date of Patent: Sep. 20, 2016

(54) APPARATUSES AND METHODS FOR REPORTING AVAILABILITY OF MEASUREMENT LOG (75) Inventor: Chih-Hsiang Wu, Taoyuan County (TW)

(73) Assignee: HTC CORPORATION, Taoyuan (TW)

(*) Notice: Subject to any disclaimer, the term of this patent is extended or adjusted under 35 U.S.C. 154(b) by 1162 days.

(21) Appl. No.: 13/075,917

(22) Filed: Mar. 30, 2011

(65) Prior Publication Data
US 2011/0244805 A1 Oct. 6, 2011

Related U.S. Application Data (60) Provisional application No. 61/319,279, filed on Mar. 31, 2010.

(51) Int. Cl.
*H04B 17/00* (2015.01)
*H04W 24/10* (2009.01)

(52) U.S. Cl.
CPC .................... *H04W 24/10* (2013.01)

(58) Field of Classification Search
CPC .. H04W 24/00; H04W 36/00; H04B 17/042; H04L 1/0026
USPC ....... 370/252, 329, 350, 241, 312, 328, 330; 455/67.11, 525, 507, 522, 436, 435.2, 455/252, 329, 350, 241, 312, 328, 330
See application file for complete search history.

(56) References Cited

U.S. PATENT DOCUMENTS

| 7,983,221 | B2* | 7/2011 | Aydin | ............... H04W 36/0055 370/331 |
| 8,189,493 | B2* | 5/2012 | Lee | ....................... H04W 24/10 370/252 |
| 8,254,932 | B2* | 8/2012 | Hsu | ....................... H04W 36/08 370/329 |
| 8,280,350 | B2* | 10/2012 | Jung | ..................... H04W 48/20 370/331 |
| 2004/0264594 | A1* | 12/2004 | Kasai | ........................ G01S 7/35 375/296 |
| 2007/0160168 | A1* | 7/2007 | Beukema | ............ H04L 27/0014 375/326 |

(Continued)

FOREIGN PATENT DOCUMENTS

| CN | 1717092 A | 1/2006 |
| CN | 1719935 A | 1/2006 |

(Continued)

OTHER PUBLICATIONS

Measurement configuration structure for carrier aggregation. Jeju Korea, Nov. 9-14, 2009. LG electronics.*

(Continued)

*Primary Examiner* — Md Talukder
(74) *Attorney, Agent, or Firm* — Birch, Stewart, Kolasch & Birch, LLP (57) ABSTRACT A communications apparatus includes a wireless module and a controller module is provided. The wireless module transmits and receives radio frequency signals to and from a service network via a set of component carrier(s), which is configured by the service network and includes at least a first component carrier. The controller module receives a measurement configuration corresponding to the first component carrier from the service network via the wireless module. The controller module keeps the measurement configuration corresponding to the first component carrier when the first component carrier is removed from the set of component carrier(s).

11 Claims, 6 Drawing Sheets

(56) References Cited

U.S. PATENT DOCUMENTS

| | | | | |
|---|---|---|---|---|
| 2007/0194932 A1* | 8/2007 | Oishi | ............... | H04B 1/525 340/572.7 |
| 2010/0254438 A1* | 10/2010 | Liu | ............... | G01S 19/30 375/150 |
| 2010/0260136 A1* | 10/2010 | Fan | ............... | H04W 74/002 370/330 |
| 2010/0285806 A1* | 11/2010 | Iwamura | ............... | H04W 36/30 455/437 |
| 2010/0322185 A1* | 12/2010 | Park | ............... | H04W 72/085 370/331 |
| 2011/0244805 A1* | 10/2011 | Wu | ............... | H04W 24/10 455/67.11 |
| 2011/0317577 A1* | 12/2011 | Yamada | ............... | H04W 24/10 370/252 |
| 2012/0294191 A1* | 11/2012 | Jung | ............... | H04L 5/001 370/254 |

FOREIGN PATENT DOCUMENTS

| | | |
|---|---|---|
| CN | 101127749 A | 2/2008 |
| CN | 101605352 A | 12/2009 |
| JP | 2006-197559 A | 7/2006 |
| JP | 2007-295079 A | 11/2007 |
| JP | 2009-147910 A | 7/2009 |
| JP | 2010-154399 A | 7/2010 |
| TW | 2009525518 A1 | 12/2009 |
| WO | WO 2007/051933 A1 | 5/2007 |
| WO | WO 2007/125702 A1 | 11/2007 |
| WO | WO 2008/053302 A2 | 5/2008 |
| WO | WO 2008/097185 A2 | 8/2008 |
| WO | WO 2009/021572 A1 | 2/2009 |
| WO | WO 2009/082173 A3 | 7/2009 |
| WO | WO 2010/010516 A2 | 1/2010 |

OTHER PUBLICATIONS

ETSI TS 136 331 V9.1.0 (Feb. 2010); LTE; Evolved Universal Terrestrial Radio Access (E-UTRA); Radio Resource Control (RRC); Protocol specification (3GPP TS 36.331 version 9.1.0 Release 9); pp. 1-234.

Huawei: "Carrier aggregation in active mode"; 3GPP TSG-RAN WG2 Meeting #66; No. R2-093104, May 4-8, 2009, XP002641351, San Francisco, USA, pp. 1-4.

LG Electronics: "Measurement configuration structure for carrier aggregation"; 3GPP TSG-RAN2 Meeting #68; No. R2-097017, Nov. 9-14, 2009, XP002641352, Jeju, Korea, pp. 1-5.

An English translation of Korean Office Action issued Jul. 25, 2012.

\* cited by examiner

APPARATUSES AND METHODS FOR REPORTING AVAILABILITY OF MEASUREMENT LOG

CROSS REFERENCE TO RELATED APPLICATIONS

This Application claims the benefit of U.S. Provisional Application No. 61/319,279, filed on Mar. 31, 2010, the entirety of which is incorporated by reference herein.

BACKGROUND OF THE INVENTION

1. Field of the Invention

The invention generally relates to apparatuses and methods for measurement control in a wireless communications system, and more particularly, to apparatuses and methods for managing measurement configurations of component carriers in a wireless communications system.

2. Description of the Related Art

Due to mobile communication technology advancements in recent years, various communication services, such as voice call services, data transfer services, and video call services, etc., may be provided to users regardless of their locations. Most mobile communications systems are multiple access systems in which access and wireless network resources are allocated to multiple users. The multiple access technologies employed by the mobile communications systems include the 1× Code Division Multiple Access 2000 (1× CDMA 2000) technology, the 1× Evolution-Data Optimized (1× EVDO) technology, the Orthogonal Frequency Division Multiplexing (OFDM) technology, and the Long Term Evolution (LIE) technology. Evolved from the LTE, the LTE Advanced is a major enhancement of the LIE standard. The LTE Advanced should be compatible with LTE equipment, and should share frequency bands with the LTE communications system. One of the important LIE Advanced benefits is its ability to take advantage of advanced topology networks, wherein optimized heterogeneous networks have a mix of macros with low power nodes such as picocells, temtocells and new relay nodes.

In addition, the LTE Advanced also introduces a multicarrier feature so as to be able to use ultra wide bandwidth, up to 100 MHz of a spectrum and support very high data rates. The multicarrier feature introduced in the LTE Advanced is supported by Carrier Aggregation (CA). In CA, two or more Component Carriers (CCs) are aggregated in order to provide wider transmission bandwidths up to 100 MHz. The CA can be applied to aggregate both contiguous and non-contiguous CCs. It is also possible to configure a User Equipment (UE) to aggregate a different number of CCs originating from the same evolved Node B (eNB) and of possibly different bandwidths in the uplink (UL) and the downlink (DL). The UE may simultaneously receive or transmit radio frequency (RF) signals via one or multiple CCs depending on its capabilities. A record of configured set of CCs aggregated for signal and data transmission may be maintianed by both the UE and the eNB for keeping information regarding to the configured CCs for the UE.

However, the number of CCs in the configured set may be changed due to the network conditions. For example, a new CC with good signal quality may be qualified by the eNB and then added into the configured set of CCs. On the contrary, when signal quality of a CC in the configured set becomes poor, the eNB may decide to remove it from the configured set. Generally, each CC corresponds to at least one measurement configuration for configuring the measurement task corresponding to the CC. The measurement tasks corresponding to the CCs are performed by the UE so as to periodically or nonperiodically measure signal quality of the CC, for example by measuring Reference Signal Received Power (RSRP), Reference Signal Received Quality (RSRQ) or Received Signal Strength Indicator (RSSI) of the CC. When content of the configured set of CCs has been changed, how to manage the measurement configuration(s) corresponding to the added or removed CC(s) is a problem which eagerly needs to be solved.

BRIEF SUMMARY OF THE INVENTION

According to an embodiment of the invention, a communications apparatus comprises a wireless module and a controller module. The wireless module transmits and receives radio frequency signals to and from a service network via a set of component carrier(s), which is configured by the service network and comprises at least a first component carrier. The controller module receives a measurement configuration corresponding to the first component carrier from the service network via the wireless module. The controller module keeps the measurement configuration corresponding to the first component carrier when the first component carrier is removed from the set of component carrier(s).

According to another embodiment of the invention, a communications apparatus comprises a wireless module and a controller module. The wireless module transmits and receives radio frequency signals to and from a service network via a set of component carrier(s) configured by the service network. The controller module receives a measurement configuration corresponding to a first component carrier from the service network via the wireless module, wherein the first component carrier is not in the set of component carrier(s). The controller module keeps the measurement configuration corresponding to the first component carrier when the first component carrier is added to the set of component carrier(s).

According to yet another embodiment of the invention, a communications apparatus for providing wireless communications services in a service network, comprises a wireless module and a controller module. The wireless module transmits and receives radio frequency signals to and from a peer device via a configured set of component carrier(s). The controller module transmits a measurement configuration corresponding to a first component carrier to the peer device via the wireless module. When the first component carrier is in the configured set of component carrier(s), the controller module keeps the measurement configuration corresponding to the first component carrier after the first component carrier is removed from the configured set of component carrier(s).

According to still another embodiment of the invention, a measurement control method comprises: establishing a Radio Resource Control (RRC) connection between a communications apparatus and a service network via a configured set of component carrier(s) which comprises a first component carrier; generating a measurement configuration corresponding to the first component carrier; removing the first component carrier from the configured set of component carrier(s); and keeping the measurement configuration corresponding to the first component carrier.

According to still another embodiment of the invention, a communications apparatus comprises a wireless module and a controller module. The wireless module transmits and receives radio frequency signals to and from a service network via a set of component carriers, which is configured by the service network and comprises at least a first component carrier. The controller module receives a measurement configuration corresponding to the first component carrier from the service network via the wireless module. The controller module releases the measurement configuration corresponding to the first component carrier when the first component carrier is removed from the set of component carriers.

According to still another embodiment of the invention, a communications apparatus for providing wireless communications services in a service network comprises a wireless module and a controller module. The wireless module transmits and receives radio frequency signals to and from a peer device via a configured set of component carriers comprising a first component carrier. The controller module transmits a measurement configuration corresponding to the first component carrier to the peer device via the wireless module. The controller module releases the measurement configuration corresponding to the first component carrier after the first component carrier is removed from the configured set of component carriers.

Other aspects and features of the present invention will become apparent to those with ordinarily skill in the art upon review of the following descriptions of specific embodiments of apparatuses and methods for measurement control in a wireless communications system.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The 3GPP specifications are used to teach the spirit of the invention, and the invention is not limited thereto.

Figure 1:
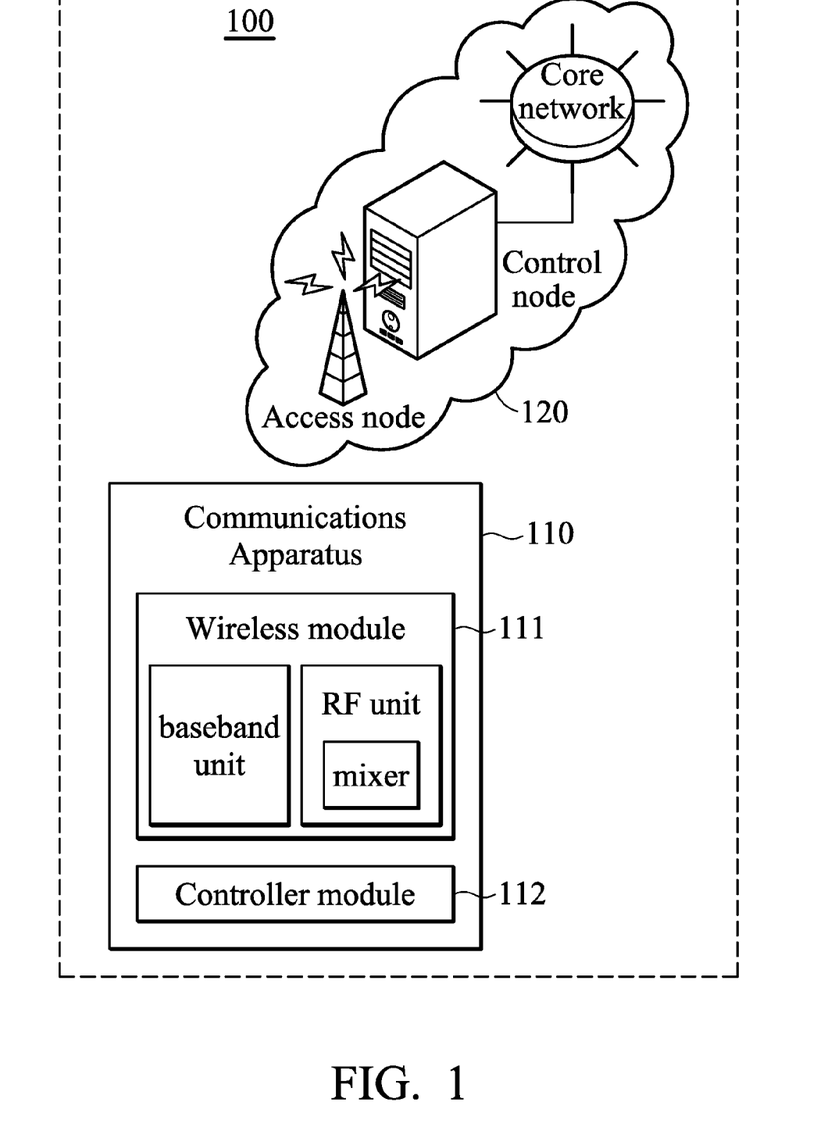
FIG. 1 is a block diagram illustrating a wireless communications system according to an embodiment of the invention.

FIG. 1 is a block diagram illustrating a wireless communications system according to an embodiment of the invention. In the wireless communications system 100, a communication apparatus 110, e.g. a User Equipment (UE), is wirelessly connected to a service network, such as the service network 120 shown in FIG. 1, for obtaining wireless communications services. The service network 120 may comprise an access node, such as an evolved Node B (eNB), interfacing between one or more communications apparatuses and the core network, for providing wireless communications services to the communications apparatus 110. The service network 120 may also comprise a control node for controlling the operation of the at least one access node. The operation of the service network 120 is in compliance with a communication protocol. In one embodiment, the service network 120 may be a Long Term Evolution (LTE) system or an LTE Advanced system.

The communications apparatus 110 may comprise at least a wireless module 111 for performing the functionality of wireless transmissions and receptions to and from the service network 120. To further clarify, the wireless module 111 may comprise a baseband unit (not shown) and a Radio Frequency (RF) unit (not shown). The baseband unit may contain multiple hardware devices to perform baseband signal processing, including Analog to Digital Conversion (ADC)/Digital to Analog Conversion (DAC), gain adjusting, modulation/demodulation, encoding/decoding, and so on. The RF unit may receive RF wireless signals, convert the received RF wireless signals to baseband signals, which are processed by the baseband unit, or receive baseband signals from the baseband unit and convert the received baseband signals to RF wireless signals, which are later transmitted. The RF unit may also contain multiple hardware devices to perform radio frequency conversion. For example, the RF unit may comprise a mixer to multiply the baseband signals with a carrier oscillated in the radio frequency of the wireless communications system, wherein the radio frequency may be 900 MHz, 1900 MHz, or 2100 MHz utilized in Universal Mobile Telecommunications System (UMTS) systems, or may be 900 MHz, 2100 MHz, or 2.6 GHz utilized in the LTE systems, or others depending on the RAT in use. Also, the communications apparatus 110 may comprise a controller module 112 for controlling the operation of the wireless module 111 and other functional components, such as a display unit and/or keypad serving as the MMI (man-machine interface), a storage unit storing data and program codes of applications or communication protocols, or others. In addition to the UMTS system and the LTE system, it is to be understood that the invention may be applied to any future UMTS-based technology.

Figure 2:
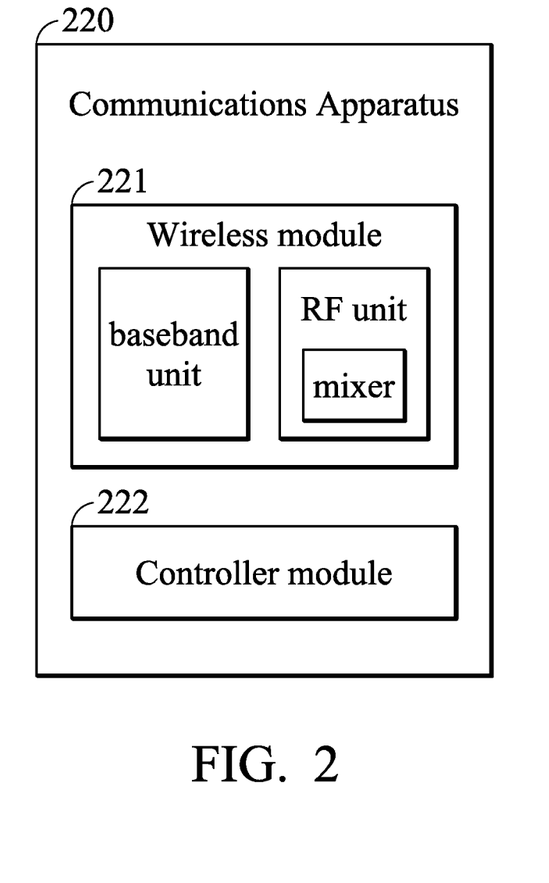
FIG. 2 shows a simplified block diagram of an access node in the service network according to an embodiment of the invention.

FIG. 2 shows a simplified block diagram of an access node as shown in FIG. 1 in the service network according to an embodiment of the invention. The access node may be, for example, an eNB, and may also be regraded as a communication apparatus for providing wireless communications services in the service network. The communications apparatus 220 may also comprise at least a wireless module 221 for performing the functionality of wireless transmissions and receptions between one or more peer devices, such as the communications apparatus 110 shown in FIG. 1, and the core network. To further clarify, the wireless module 221 may comprise a baseband unit (not shown) and a Radio Frequency (RF) unit (not shown). The baseband unit may contain multiple hardware devices to perform baseband signal processing, including Analog to Digital Conversion (ADC)/Digital to Analog Conversion (DAC), gain adjusting, modulation/demodulation, encoding/decoding, and so on. The RF unit may receive RF wireless signals, convert the received RF wireless signals to baseband signals, which are processed by the baseband unit, or receive baseband signals from the baseband unit and convert the received baseband signals to RF wireless signals, which are later transmitted. The RF unit may also contain multiple hardware devices to perform radio frequency conversion. For example, the RF unit may comprise a mixer to multiply the baseband signals with a carrier oscillated in the radio frequency of the wireless communications system, wherein the radio frequency may be 900 MHz, 1900 MHz, or 2100 MHz utilized in Universal Mobile Telecommunications System (UMTS) systems, or may be 900 MHz, 2100 MHz, or 2.6 GHz utilized in the LTE systems, or others depending on the RAT in use. Also, the communications apparatus 220 may comprise a controller module 222 for controlling the operation of the wireless module 221 and other functional components, such as a storage unit storing data and program codes of applications or communication protocols, or others. In addition to the UMTS system and the LTE system, it is to be understood that the invention may be applied to any future UMTS-based technology.

As previously described, it is possible to configure a User Equipment (UE) to aggregate a plurality of Component Carriers (CCs) to provided wider transmission bandwidths. When Carrier Aggregation (CA) is configured, the UE only has one Radio Resource Control (RRC) connection with the network. During the RRC connection establishment/re-establishment, one cell may provide the security input to the UE. After the RRC connection establishment/re-establishment procedure, the CC corresponding to that cell may be referred to as the Downlink Primary Component Carrier (DL PCC). There is always one DL PCC and one UL PCC configured per UE in a connected mode. Within the configured set of CCs, other CCs may be referred to as Secondary Component Carriers (SCCs). The RRC Re-establishment may be triggered when the DL PCC experiences Radio Link Failure (RLF).

The UE is responsible to measure signal qualities of one or more CCs in accordance with one or more measurement configuration(s) as provided by the EUTRAN, regardless of whether the corresponding CC is in the configured set or not, where the network side of the EUTRAN is composed by the eNBs. The UE is also responsible to report measurement information to the eNBs. The Measurement Configuration (MC) may comprise a plurality of parameters to describe information related to the object associated to the CC to be measured so as to facilitate the measurement task of the CC. Generally, one measurement configuration may correspond to one CC, but one CC may correspond to one or more measurement configurations. The EUTRAN may provide the measurement configuration applicable for a UE by means of dedicated signaling, i.e. using an RRC message (for example, an RRCConnectionReconfiguration message). According to an embodiment of the invention, the measurement configuration (MeasConfig) may include at least one of the following parameters:

1. Measurement objects (measObject): The objects on which the UE shall perform the measurements, for example, the frequency band of the corresponding CC.

2. Reporting configurations (reportConfig): A list of reporting configurations, where each reporting configuration may consist of the following:

Reporting criterion: The criterion that triggers the UE to send a measurement report. This may either be periodical or a single event description.

Reporting format: The quantities that the UE includes in the measurement report and associated information (e.g. number of cells to report).

3. Measurement identities (measId): A list of measurement identities where each measurement identity links one measurement object with one reporting configuration.

4. Quantity configurations (quantityConfig): The quantity configuration defines the measurement quantities and associated filtering used for all event evaluation and related reporting of that measurement type.

5. Measurement gaps (measGapConfig): Periods that the UE may use to perform measurements, i.e. no (UL, DL) transmissions are scheduled.

Figure 3:
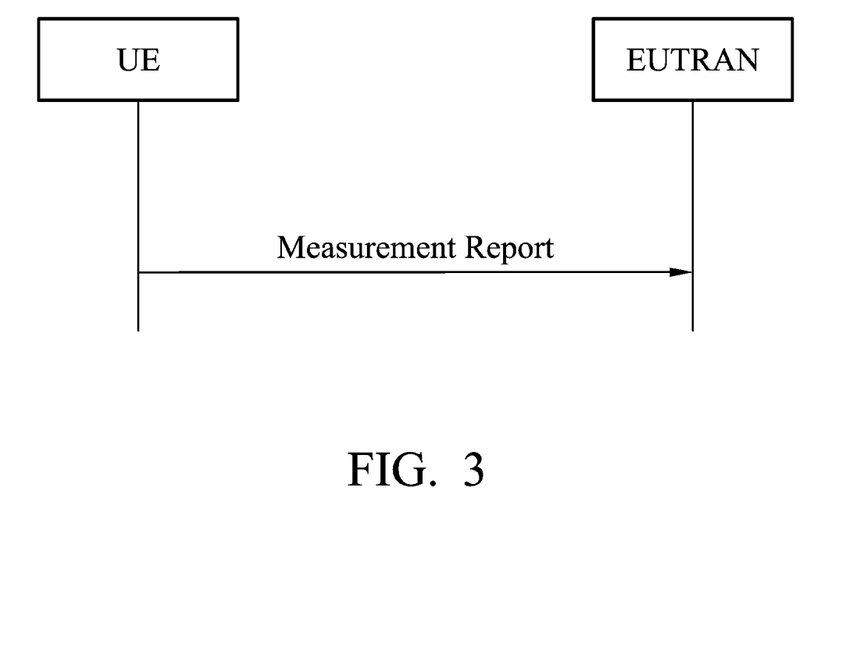
FIG. 3 shows a message flow of a measurement report transmitted from the UE to the EUTRAN according to an embodiment of the invention.

Generally, the EUTRAN only configures a single measurement object for a given frequency. Based on the measurement configuration(s) provided by the EUTRAN, the UE may perform the measurement task for the corresponding measurement object(s), and report the measurement result according to the reporting configuration(s). FIG. 3 shows a message flow of a measurement report transmitted from the UE to the EUTRAN according to an embodiment of the invention. The eNB in the EUTRAN may further configure one or more CCs to the UE according to the received measurement report. The addition and removal of a CC to or from the configured set of CCs are decided by the eNB. As previously described, the CC in the configured set may be added and removed due to the network condition. For example, a new CC with good signal quality may be qualified by the eNB and then added into the configured set of CCs. On the contrary, when signal quality of a CC in the configured set becomes poor, the eNB may decide to remove it from the configured set. The eNB may send an RRC message (for example, the RRCConnectionReconfiguration message) to request the UE to add a CC to or remove a CC configured to the UE from the configured set of CCs.

However, once a CC is added or removed by the UE, the measurement configuration corresponding to that CC becomes not clear. For example, the eNB may not receive any measurement result of a CC from the UE after the UE has removed the CC from the configured set of CCs. However, even if the CC is not in the configured set of CCs, the eNB may still regard the CC as a candidate CC and need the corresponding measurement result. For another example, suppose that a UE is configured with two DL CCs (CC1 and CC2) by an eNB. When a CC1 is replaced with a CC3 (i.e. CC1 is removed and the CC3 is added simultaneously), how the UE and the eNB handle a measurement configuration corresponding to the CC1 and a measurement configuration corresponding to the CC3 becomes random. In order to solve the above mentioned problems, in the following paragraphs, apparatuses and methods for managing measurement configurations of component carriers in a wireless communication system are provided.

According to a first aspect of the invention, for the communications apparatus 110 (e.g. the UE) as shown in FIG. 1, when a CC is removed from or added to the configured set of CCs, the UE may determine to keep the measurement configuration corresponding to the removed or added CC. For example, suppose that the communications apparatus 110 is configured with at least a first CC (CC1) for transmitting and receiving RF signals to and from the service network (e.g. the eNB in the EUTRAN)), then the CC1 would likely be aggregated in a configured set of CC(s). When the communications apparatus 110 receives a message from the service network indicating that a second component carrier (CC2) has to be added, the communications apparatus 110 may further add the CC2 to the configured set of CCs in response to the received message. According to an embodiment of the invention, after adding the CC2 to the configured set of CCs, the communications apparatus 110 may further keep a measurement configuration corresponding to the CC2 received from the service network. Therefore, the communications apparatus 110 may periodically or non-periodically perform measurement of the CC2 according to the measurement configuration corresponding to the CC2.

Suppose that the communications apparatus 110 decides to remove the CC2 from the configured set of CCs due to some network condition, according to an embodiment of the invention, the communications apparatus 110 may still keep the measurement configuration corresponding to the CC2 after removing the CC2. For example, the service network (e.g. the eNB) may send an RRC message (for example, the RRCConnectionReconfiguration) to the communications apparatus 110 to indicate that the CC2 configured to the communications apparatus 110 has to be removed, or the communications apparatus 110 may decide to remove the CC2 due to the fact that the communications apparatus 110 has performed an RRC connection reestablishment to another CC. Both of the cases may cause the communications apparatus 110 to remove the CC2 from the configured set of CCs.

According to another embodiment of the invention, the communications apparatus 110 may also suspend performing measurement of the CC2 after removing the CC2 from the configured set of component carrier(s) until a message indicating that the measurement of the CC2 can be resumed is received. For example, the message may be a RRCConnectionReconfiguration indicating that CC2 has to be added to the configured set of CCs. Because the measurement configuration corresponding to the CC2 is kept by the communications apparatus 110, the service network does not have to setup a new measurement configuration corresponding to the CC2 when the service network wants the communications apparatus 110 to perform measurement on the CC2, and can reconfigure the measurement configuration (e.g. adding new trigger event) when needed. Therefore, the communications apparatus 110 may still perform measurement of the CC2 after the removal of the CC2.

According to yet another embodiment of the invention, for the access node or the eNB for providing wireless communications services in the service network as shown in FIG. 1, after asking the communications apparatus 110 to remove the CC2 from the configured set of CCs, the measurement configuration corresponding to the CC2 may also be kept at the service network side. Therefore, the UE and the network may have a same status of the measurement configuration corresponding to the CC2.

Figure 4:
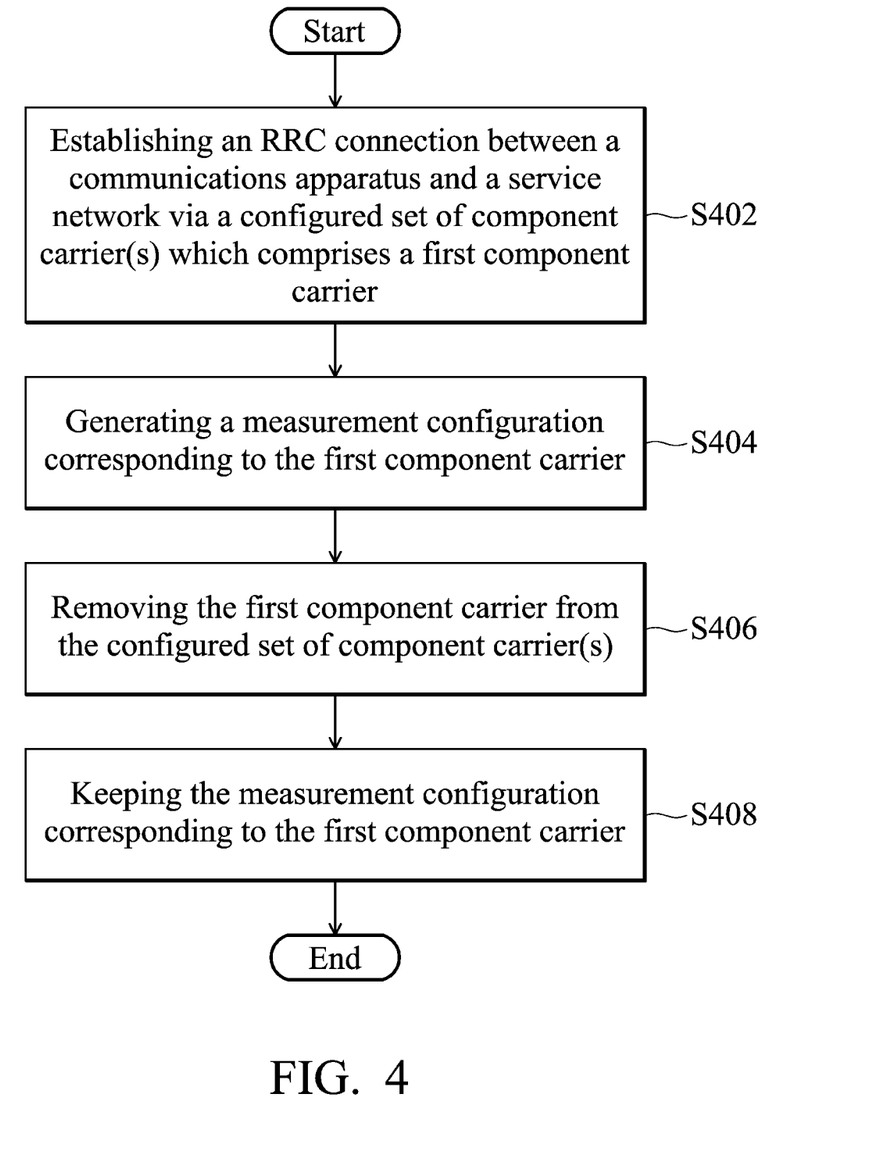
FIG. 4 is a flow chart illustrating a measurement control method according to the first aspect of the invention.

FIG. 4 is a flow chart illustrating a measurement control method according to the first aspect of the invention. To begin, an RRC connection between a communications apparatus and a service network is established via a configured set of component carrier(s) which comprises a first component carrier (Step S402). Next, a measurement configuration corresponding to the first component carrier is generated (Step S404). Next, the first component carrier is removed from the configured set of component carrier(s) (Step S406) in response to transmitting or receiving a message to remove the first component carrier from the configured set of component carrier(s) or initiating an RRC reestablishment. Finally, the measurement configuration corresponding to the first component carrier is kept by the communications apparatus and/or the service network (Step S408).

Figure 5:
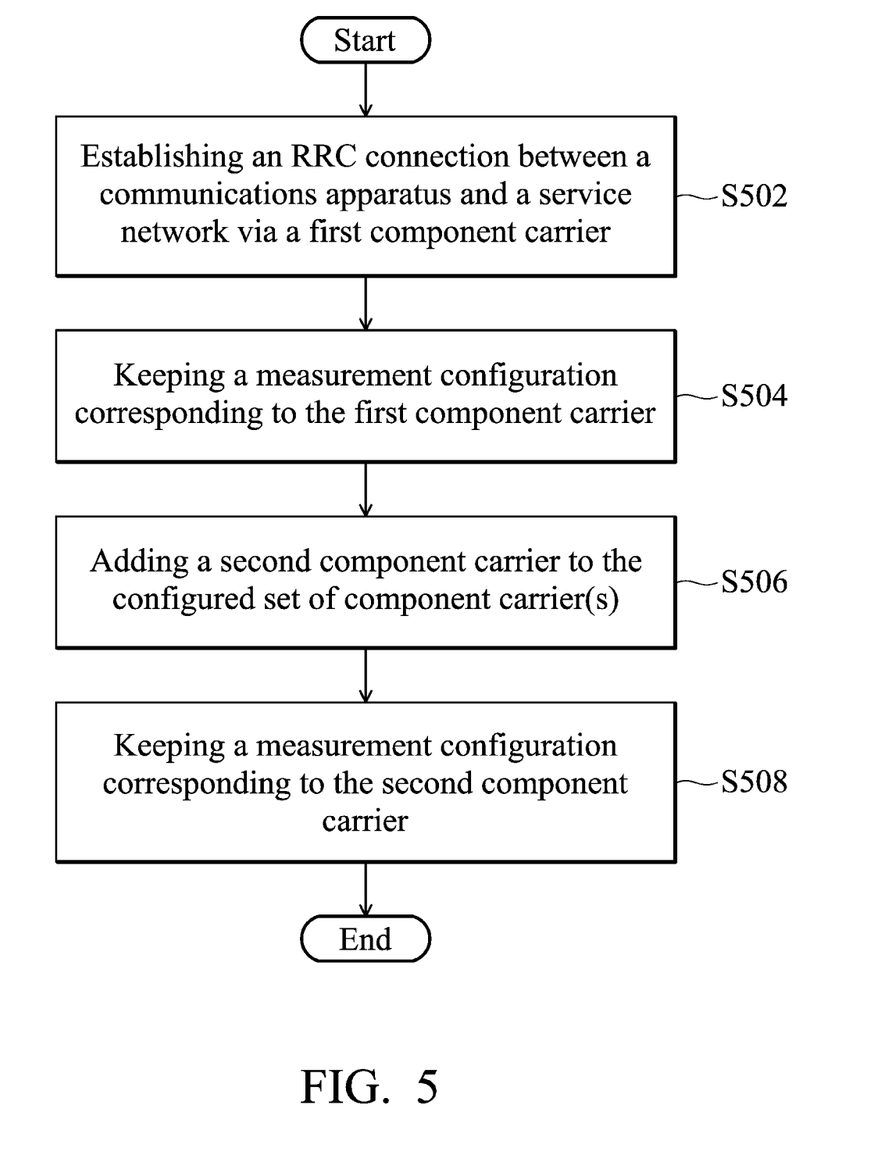
FIG. 5 is another flow chart illustrating a measurement control method according to the first aspect of the invention.

FIG. 5 is a flow chart illustrating another measurement control method according to the first aspect of the invention. To begin, a Radio Resource Control (RRC) connection is established between a communications apparatus and a service network via a first component carrier (CC) (Step S502). As previously described, the first CC is configured by the service network and aggregated in a configured set of CC(s) utilized for transmitting and receiving the radio frequency signals between the communications apparatus and the service network. Next, a measurement configuration corresponding to the first CC is kept by both the communications apparatus and the service network (Step S504). Next, a second CC, which is not in the configured set of CC(s), configured by the service network is added to the configured set of CC(s) by the communications apparatus (Step S506). Accordingly, a measurement configuration corresponding to the second CC is kept by both the communications apparatus and the service network (Step S508).

According to a second aspect of the invention, for the communications apparatus 110 (e.g. the UE) as shown in FIG. 1, when a CC is removed from the configured set of CCs, the UE may determine to release (or remove or invalidate) the measurement configuration corresponding to the removed CC. For example, suppose that the communications apparatus 110 is configured with a plurality of CCs for transmitting and receiving RF signals to and from the service network (e.g. the eNB in the EUTRAN), the CCs would likely be aggregated in the configured set of CC(s). The measurement configurations correspond to the CCs may also be received from the service network and kept by the communications apparatus 110 for performing measurement of the CCs.

When the communications apparatus 110 determines to remove a first CC (CC1) from the configured set of CCs according to a network condition, the communications apparatus 110 may determine to release a measurement configuration corresponding to the CC1 (e.g. by removing the measurement identities included in the measurement configuration). As previously described, the service network (e.g. the eNB) may send an RRC message (for example, the RRCConnectionReconfiguration) to the communications apparatus 110 to indicate that the CC1 configured to the communications apparatus 110 has to be removed, or the communications apparatus 110 may decide to remove the CC1 due to the fact that the communications apparatus 110 has performed an RRC connection reestablishment to another CC. Both of the cases may cause the communications apparatus 110 to remove the CC1 from the configured set of CCs.

According to an embodiment of the invention, the communications apparatus 110 may stop performing measurement of the CC1 in response to removing the CC1. According to another embodiment of the invention, the communications apparatus 110 may also remove all measurement results corresponding to the CC1 from a measurement report list to be transmitted to the service network in response to removing the CC1. In some embodiments of the invention, each CC may have its own measurement report list (e.g. a variable measurement report list VarMeasReportList), or the measurement results of all CCs may be stored in the measurement report list. The variable measurement report list VarMeasReportList may include information about the measurements for which the triggering conditions have been met. The communications apparatus 110 may remove measurement reporting entries corresponding to the CC1 within the variable measurement report list VarMeasReportList.

According to yet another embodiment of the invention, the communications apparatus 110 may also reset a periodical reporting timer corresponding to the CC1 in response to removing the CC1, wherein the periodical reporting timer is utilized by the controller module 112 to periodically report measurement results of the CC1. For example, the communications apparatus 110 may reset the periodical reporting timer or timer T321, whichever one is running, as well as associated information (e.g. timeToTrigger) for all measurement identities (measId) corresponding to the CC1.

According to yet another embodiment of the invention, for the access node or the eNB for providing wireless communications services in the service network as shown in FIG. 1, after asking the communications apparatus 110 to remove the CC1 from the configured set of CCs, the measurement configuration corresponding to the CC1 may also be released at the service network side. Therefore, the UE and the network may have a same status of the measurement configuration corresponding to the CC1.

Figure 6:
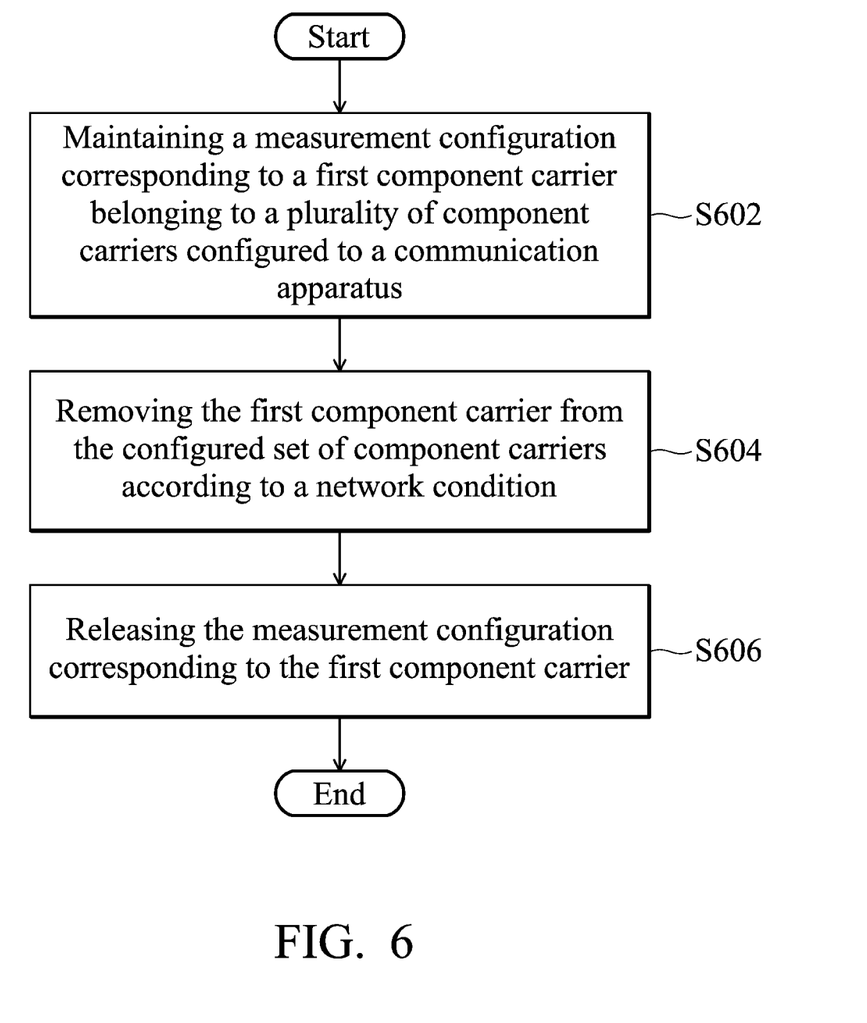
FIG. 6 is a flow chart illustrating a measurement control method according to the second aspect of the invention.

FIG. 6 is a flow chart illustrating a measurement control method according to the second aspect of the invention. To begin, a measurement configuration corresponding to a first component carrier belonging to a plurality of CCs configured by a service network to a communication apparatus may be maintained by both the communications apparatus and the service network (Step S602). The CCs may be aggregated in a configured set of CCs utilized for transmitting and receiving radio frequency signals between the communications apparatus and the service network. Next, the first CC may be removed from the configured set of CCs by the communications apparatus according to a network condition (Step S604). Finally, the measurement configuration corresponding to the first CC may be released by both the communications apparatus and the service network (Step S606).

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A communications apparatus, comprising:
   a wireless device, comprising a baseband unit performing baseband signal processing and a radio frequency circuit transmitting and receiving radio frequency signals to and from a service network via a set of component carrier(s) which is configured by the service network and comprises at least a first component carrier, wherein the radio frequency circuit comprises a mixer for multiplying baseband signals with a carrier oscillated in a radio frequency of the service network; and
   a controller module, receiving a measurement configuration corresponding to the first component carrier from the service network via the wireless device;
   wherein the controller module keeps the measurement configuration corresponding to the first component carrier when the first component carrier is removed from the set of component carrier(s) in response to receiving a first message to remove the first component carrier from the set of component carrier(s) from the service network via the wireless device, or keeps the measurement configuration corresponding to the first component carrier when the first component carrier is removed from the set of component carrier(s) in response to initiating an RRC reestablishment,
   wherein the controller module further performs measurement of the first component carrier according to the kept measurement configuration after the first component carrier is removed from the set of component carrier(s),
   wherein the measurement configuration includes at least one of a measurement object, a reporting configuration and a measurement identity, and
   wherein the controller module is configured to measure signal quality of the first component carrier according to the measurement configuration and report measurement result to the service network.

2. The communications apparatus of claim 1, wherein the controller module further suspends performing measurement of the first component carrier after the first component carrier is removed from the set of component carrier(s) until receiving a second message to resume performing the measurement of the first component carrier from the service network via the wireless device.

3. A communications apparatus, comprising:
   a wireless device, comprising a baseband unit configured for performing baseband signal processing and a radio frequency circuit configured for transmitting and receiving radio frequency signals to and from a service network via a set of component carrier(s) configured by the service network, wherein the radio frequency circuit comprises a mixer for multiplying baseband signals with a carrier oscillated in a radio frequency of the service network; and
   a controller module, receiving a measurement configuration corresponding to a first component carrier from the service network via the wireless device, wherein the first component carrier is not in the set of component carrier(s);
   wherein the controller module keeps the measurement configuration corresponding to the first component carrier when the first component carrier is added to the set of component carrier(s) in response to receiving a first message to add the first component carrier into the set of component carrier(s) from the service network via the wireless device,
   wherein the controller module further performs measurement of the first component carrier according to the kept measurement configuration after the first component carrier is added to the set of component carrier(s),
   wherein the measurement configuration includes at least one of a measurement object, a reporting configuration and a measurement identity, and
   wherein the controller module is configured to measure signal quality of the first component carrier according to the measurement configuration and report measurement result to the service network.

4. The communications apparatus of claim 3, wherein the controller module further suspends performing measurement of the first component carrier after the first component carrier is added to the set of component carrier(s) until receiving a message to resume performing the measurement of the first component carrier from the service network via the wireless device.

5. A communications apparatus for providing wireless communications services in a service network, comprising:
   a wireless device, comprising a baseband unit configured for performing baseband signal processing and a radio frequency circuit configured for transmitting and receiving radio frequency signals to and from a peer device via a configured set of component carrier(s), wherein the radio frequency circuit comprises a mixer for multiplying baseband signals with a carrier oscillated in a radio frequency of the service network; and
   a controller module, transmitting a measurement configuration corresponding to a first component carrier to the peer device via the wireless device;

wherein when the first component carrier is in the configured set of component carrier(s), the controller module keeps the measurement configuration corresponding to the first component carrier after the first component carrier is removed from the configured set of component carrier(s) in response to transmitting a first message to remove the first component carrier from the set of component carrier(s) to the peer device via the wireless device, or keeps the measurement configuration corresponding to the first component carrier after the first component carrier is removed from the configured set of component carrier(s) in response to an RRC reestablishment, and receives a measurement result of the first component carrier from the peer device after the first component carrier is removed from the set of component carrier(s), wherein the measurement configuration includes at least one of a measurement object, a reporting configuration and a measurement identity.

6. The communications apparatus of claim 5, wherein when the first component carrier is not in the configured set of component carrier(s), the controller module keeps the measurement configuration corresponding to the first component carrier after the first component carrier is added to the configured set of component carrier(s).

7. A measurement control method, comprising:
Establishing a Radio Resource Control (RRC) connection between a communications apparatus and a service network via a configured set of component carrier(s) which comprises a first component carrier, wherein the communications apparatus comprising:
  a wireless device, comprising a baseband unit performing baseband signal processing and a radio frequency circuit transmitting and receiving radio frequency signals to and from the service network via a set of component carrier(s) which is configured by the service network and comprises at least the first component carrier, wherein the radio frequency circuit comprises a mixer for multiplying baseband signals with a carrier oscillated in a radio frequency of the service network; and
  a controller module, receiving a measurement configuration corresponding to the first component carrier from the service network via the wireless device;
generating the measurement configuration corresponding to the first component carrier, the measurement configuration including at least one of a measurement object, a reporting configuration and a measurement identity;
removing the first component carrier from the configured set of component carrier(s);
keeping the measurement configuration corresponding to the first component carrier in response to removing the first component carrier; and
measuring signal quality of the first component carrier according to the kept measurement configuration by the communications apparatus after removing the first component carrier from the configured set of component carrier(s) and reporting measurement result to the service network.

8. A measurement control method, comprising:
receiving a measurement configuration corresponding to a first component carrier from a service network by a communications apparatus, wherein a set of component carrier(s) which is configured by the service network comprises at least the first component carrier, and wherein the communications apparatus comprises:
  a wireless device, comprising a baseband unit performing baseband signal processing and a radio frequency circuit transmitting and receiving radio frequency signals to and from the service network via the set of component carrier(s), wherein the radio frequency circuit comprises a mixer for multiplying baseband signals with a carrier oscillated in a radio frequency of the service network; and
  a controller module, receiving the measurement configuration corresponding to the first component carrier from the service network via the wireless device;
keeping the measurement configuration corresponding to the first component carrier when the first component carrier is removed from the set of component carrier(s) in response to receiving a first message to remove the first component carrier from the set of component carrier(s) from the service network, or keeping the measurement configuration corresponding to the first component carrier when the first component carrier is removed from the set of component carrier(s) in response to initiating an RRC reestablishment; and
performing measurement of the first component carrier according to the kept measurement configuration after the first component carrier is removed from the set of component carrier(s),
wherein the measurement configuration includes at least one of a measurement object, a reporting configuration and a measurement identity, and
wherein the step of performing measurement of the first component carrier further comprises:
  measuring signal quality of the first component carrier according to the kept measurement configuration; and
  reporting measurement result to the service network.

9. The method of claim 8, further comprising:
suspending performing measurement of the first component carrier after the first component carrier is removed from the set of component carrier(s) until receiving a second message to resume performing the measurement of the first component carrier from the service network.

10. A measurement control method, comprising:
transmitting a measurement configuration corresponding to a first component carrier to a peer device by a communications apparatus, wherein the communications apparatus comprises:
  a wireless device, comprising a baseband unit configured for performing baseband signal processing and a radio frequency circuit configured for transmitting and receiving radio frequency signals to and from the peer device via a configured set of component carrier (s), wherein the radio frequency circuit comprises a mixer for multiplying baseband signals with a carrier oscillated in a radio frequency of the service network; and
  a controller module, transmitting the measurement configuration corresponding to the first component carrier to the peer device via the wireless device;
when the first component carrier is in the configured set of component carrier(s), keeping the measurement configuration corresponding to the first component carrier after the first component carrier is removed from the configured set of component carrier(s) in response to transmitting a first message to remove the first component carrier from the set of component carrier(s) to the peer device, or keeping the measurement configuration corresponding to the first component carrier after the first component carrier is removed from the configured set of component carrier(s) in response to in response to an RRC reestablishment; and receiving a measurement result of the first component carrier from the peer device after the first component carrier is removed from the set of component carrier(s), wherein the measurement configuration includes at least one of a measurement object, a reporting configuration and a measurement identity.

11. The method of claim 8, further comprising:

when the first component carrier is not in the configured set of component carrier(s), keeping the measurement configuration corresponding to the first component carrier after the first component carrier is added to the configured set of component carrier(s).

* * * * *